(12) United States Patent
Li

(10) Patent No.: US 12,199,517 B2
(45) Date of Patent: Jan. 14, 2025

(54) CONTROLLER FOR DRIVING A POWER SWITCH IN SLAVE PHASE OF A MULTIPHASE POWER CONVERTER AND POWER CONVERTER COMPRISING THE SAME

(71) Applicant: Monolithic Power Systems, Inc., San Jose, CA (US)

(72) Inventor: Yan-Cun Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 481 days.

(21) Appl. No.: 17/700,272

(22) Filed: Mar. 21, 2022

(65) Prior Publication Data

US 2023/0299679 A1 Sep. 21, 2023

(51) Int. Cl.
| | |
|---|---|
| H02M 3/158 | (2006.01) |
| H02M 1/00 | (2006.01) |
| H02M 1/08 | (2006.01) |
| H02M 1/088 | (2006.01) |
| H02M 7/06 | (2006.01) |

(52) U.S. Cl.
CPC ....... *H02M 3/1586* (2021.05); *H02M 1/0009* (2021.05); *H02M 1/083* (2013.01); *H02M 1/088* (2013.01); *H02M 7/06* (2013.01)

(58) Field of Classification Search
CPC ............ H02M 3/1586; H02M 1/0006; H02M 1/0009; H02M 1/083; H02M 1/088; H02M 7/06; H02M 1/0058; H02M 1/4225; H02M 1/4258; H02M 1/08; H02M 1/42

See application file for complete search history.

(56) References Cited

U.S. PATENT DOCUMENTS

| | | | |
|---|---|---|---|
| 6,912,144 B1 * | 6/2005 | Clavette | H02M 3/1584 323/283 |
| 10,200,050 B1 * | 2/2019 | Ren | G05F 3/04 |
| 11,545,903 B1 * | 1/2023 | Li | H02M 1/0006 |
| 11,616,444 B2 * | 3/2023 | Nguyen | H03K 5/24 323/285 |
| 11,831,242 B2 * | 11/2023 | Wu | H02M 1/088 |
| 2004/0036452 A1 * | 2/2004 | Brooks | H02M 3/1584 323/237 |
| 2006/0158159 A1 * | 7/2006 | Nishimori | H02M 3/1584 323/222 |
| 2007/0296387 A1 * | 12/2007 | Dong | H02M 3/157 323/285 |
| 2009/0153110 A1 * | 6/2009 | Huang | H02J 1/102 323/282 |
| 2009/0257257 A1 * | 10/2009 | Adragna | H02M 3/1584 363/65 |

(Continued)

*Primary Examiner* — Yusef A Ahmed
(74) *Attorney, Agent, or Firm* — Perkins Coie LLP

(57) ABSTRACT

A power converter includes a controller for driving a corresponding power switch in the power converter. The controller may have a current sense terminal adapted to sense/receive a current sense signal indicative of a current flowing through the corresponding power switch and a current limit terminal adapted to receive a reference current sense signal indicative of a current flowing through another power switch in the power converter. The controller may turn off the corresponding power switch once the current sense signal reaches a peak value of the reference current sense signal.

16 Claims, 7 Drawing Sheets

(56) References Cited

U.S. PATENT DOCUMENTS

| | | | |
|---|---|---|---|
| 2010/0033153 A1* | 2/2010 | Xing | H02M 3/156 |
| | | | 323/288 |
| 2010/0301826 A1* | 12/2010 | Moussaoui | H02M 3/1584 |
| | | | 323/285 |
| 2012/0044014 A1* | 2/2012 | Stratakos | H03K 17/145 |
| | | | 327/530 |
| 2013/0021009 A1* | 1/2013 | Waltman | H02M 3/1584 |
| | | | 323/271 |
| 2014/0097818 A1* | 4/2014 | Wiktor | H02M 3/1584 |
| | | | 323/283 |
| 2018/0191251 A1* | 7/2018 | Tao | H02M 1/08 |
| 2018/0191333 A1* | 7/2018 | Chen | H03K 7/08 |
| 2018/0269787 A1* | 9/2018 | Chen | H02M 3/156 |
| 2018/0337599 A1* | 11/2018 | Chen | H02M 3/158 |
| 2021/0028683 A1* | 1/2021 | Jiang | H02M 1/084 |
| 2021/0288578 A1* | 9/2021 | Luo | H02M 1/088 |
| 2022/0337162 A1* | 10/2022 | Shen | H02M 3/156 |
| 2023/0110617 A1* | 4/2023 | Yang | H02M 3/1584 |
| | | | 323/266 |
| 2023/0179081 A1* | 6/2023 | Li | H02M 1/0006 |
| | | | 363/21.01 |
| 2024/0128858 A1* | 4/2024 | Cheung | H02M 1/08 |
| 2024/0186900 A1* | 6/2024 | Zhang | H02M 1/0003 |

* cited by examiner

CONTROLLER FOR DRIVING A POWER SWITCH IN SLAVE PHASE OF A MULTIPHASE POWER CONVERTER AND POWER CONVERTER COMPRISING THE SAME

TECHNICAL FIELD

The present invention generally relates to electronic circuits, and more particularly but not exclusively, to switch controller for driving a power switch and associated power converters comprising the switch controller.

BACKGROUND

Multiphase power converters are widely used in various applications. However, existing multiphase power converters such as interleaving boost power factor correction ("PFC") converter and interleaving flyback converter need complex controller/controllers to drive master phase and slave phases of the multiphase power converters. Moreover, different controllers need to be specifically designed for different multiphase power converters of different topologies. In addition, simple and cost effective solutions to achieve current sharing or current balancing between the different phases of a multiphase power converter may be one of the important functions required in most applications.

SUMMARY

Embodiments of the present invention are directed to a power converter having a plurality of N controllers, N being an integer greater than 1. Each one of the N controllers may be configured to drive a corresponding one power switch, wherein the first controller of the plurality of N controllers is configured as a master controller having a current sense terminal adapted to sense/receive a first current sense signal indicative of a current flowing through the corresponding first power switch. For each i from 2 to N, the $i^{th}$ controller of the plurality of N controllers is configured to sense/receive an $i^{th}$ current sense signal indicative of a current flowing through the corresponding $i^{th}$ power switch at a current sense terminal of the $i^{th}$ controller, and is further configured to receive the $(i-1)^{th}$ current sense signal at a current limit terminal of the $i^{th}$ controller, and is further adapted to be configured to turn off the corresponding $i^{th}$ power switch once the $i^{th}$ current sense signal reaches a peak value of the $(i-1)^{th}$ current sense signal, and wherein i is an integer.

Embodiments of the present invention are also directed to a controller adapted for driving a power switch in one phase of a power converter. The controller may include: a current sense terminal, adapted to be configured to sense/receive a current sense signal indicative of a current flowing through the power switch in the one phase; and a current limit terminal, adapted to be configured to receive a reference current sense signal indicative of a current flowing through another power switch in the power converter. The controller may be configured to reset an output switch driving signal once the current sense signal reaches a peak value of the reference current sense signal.

Embodiments of the present invention are further directed to a power converter, comprising: a first controller, configured as a master controller adapted to sense/receive a first current sense signal indicative of a current flowing through a power switch in a master phase of the power converter; and a second controller, configured as a slave controller adapted to sense/receive a second current sense signal indicative of a current flowing through a power switch in a corresponding slave phase of the power converter, and further configured to receive the first current sense signal, and further configured to turn off the power switch in the corresponding slave phase once the second current sense signal reaches a peak value of the first current sense signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
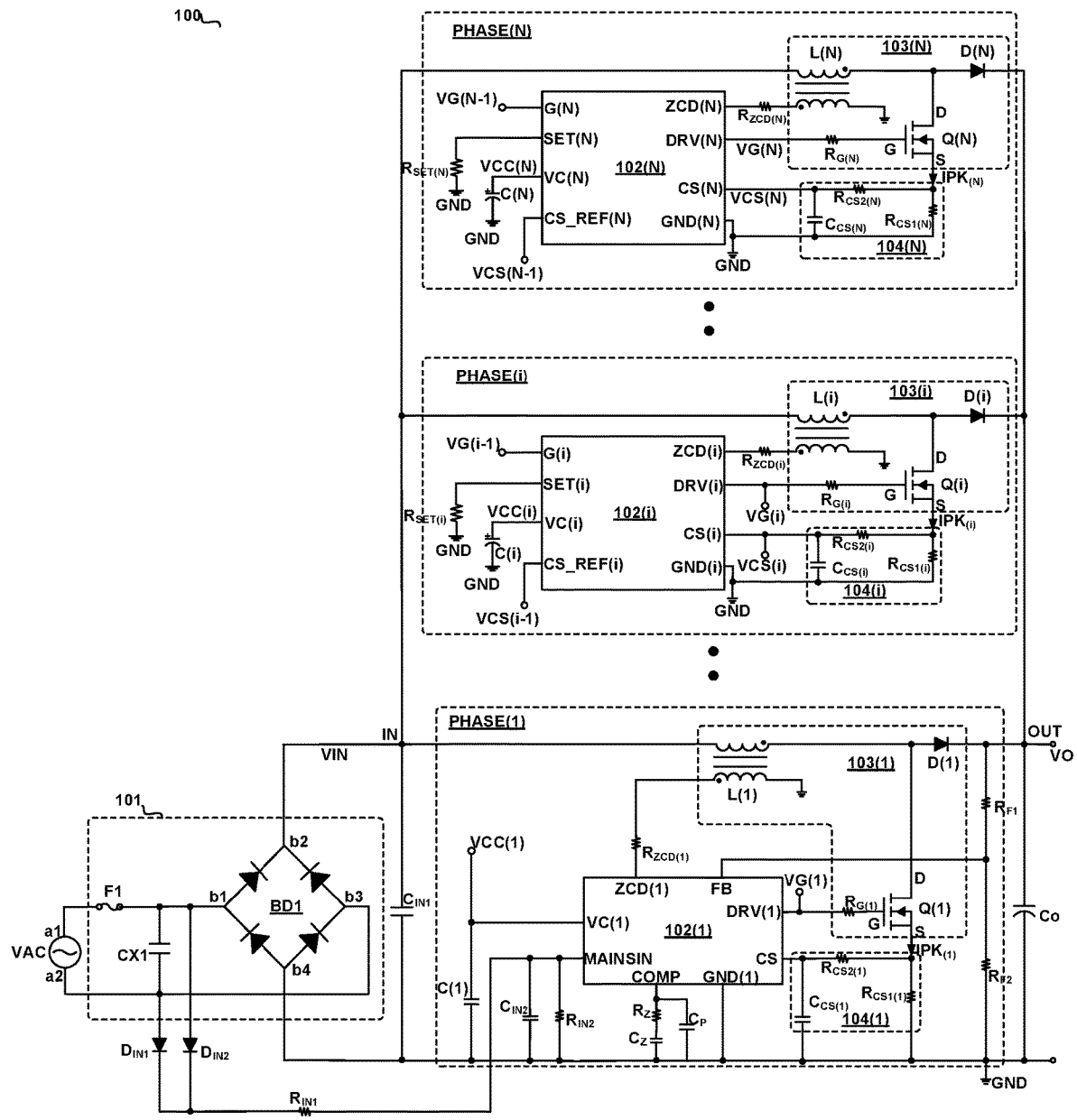
FIG. 1 schematically illustrates a power converter 100 in accordance with an exemplary embodiment of the present invention.

FIG. 1 schematically illustrates a power converter 100 in accordance with an exemplary embodiment of the present invention. The power converter 100 may include a rectification unit 101 for rectifying an alternating current ("AC") input signal VAC to output a rectified direct current ("DC") supply signal VIN. The power converter 100 may further comprise a plurality of N power conversion phases {PHASE(i), i=1, 2, . . . , N} coupled in parallel between a first node (e.g. a DC input node) IN and a second node (e.g. an output node) OUT, wherein N is an integer greater than 1 and represents the total number of power conversion phases that the power converter 100 may include which may be set or determined by customers/users in practical applications depending on real application requirements. That is to say, the index i is a variable traverses the integers from 1 to N. Each one of the plurality of (e.g. N) power conversion phases {PHASE(i), i=1, 2, . . . , N}, including all the sub-circuits and elements that each power conversion phase PHASE(i) may comprise, may be configured to use a reference ground potential at a third node GND (e.g. a ground node) of the power converter 100 as a ground potential of each power conversion phase PHASE(i). An input capacitor $C_{IN1}$ may be coupled across the first node IN and the third node GND of the power converter 100. The first node IN may be configured to receive the rectified DC supply signal VIN in an embodiment. An output capacitor Co may be coupled across the second node OUT and the third node GND of the power converter 100.

In accordance with an embodiment of the present disclosure, the rectification unit 101 may exemplarily comprise four diodes connected into a full bridge BD1 having a first terminal b1 coupled to a first terminal a1 of an AC source via a fuse F1, a second terminal b2 connected to the first node IN, a third terminal b3 connected to a second terminal a2 of the AC source and a fourth terminal b4 connected to the third node GND of the power converter 100. The AC source may be configured to provide the AC input signal VAC. A capacitive device CX1 may be coupled between the first terminal b1 and the third terminal b3 of the full bridge BD1.

In accordance with an embodiment of the present disclosure, for each i from 1 to N, the $i^{th}$ power conversion phase PHASE(i) of the N power conversion phases {PHASE(i), i=1, 2, . . . , N} may comprise an $i^{th}$ power stage 103(i) including an $i^{th}$ power switch Q(i) and a corresponding $i^{th}$ controller 102(i) for driving the $i^{th}$ power switch Q(i) to perform on and off switching. Therefore, it would be understood that the power converter 100 having the N power conversion phases {PHASE(i), i=1, 2, . . . , N} may include N power switches {Q(i), i=1, 2, . . . , N} and N controllers {102(i), i=1, 2, . . . , N}, with each one of the N controllers {102(i), i=1, 2, . . . , N} configured to drive a corresponding one of the N power switches {Q(i), i=1, 2, . . . , N} in a corresponding one of the N power conversion phases {PHASE(i), i=1, 2, . . . , N}. In an embodiment, the first power conversion phase PHASE(1) of the N power conversion phases {PHASE(i), i=1, 2, . . . , N} may be configured as a master phase, and the first controller 102(1) of the N controllers {102(i), i=1, 2, . . . , N} may be configured as a master controller to provide a first switch driving signal VG(1). The first switch driving signal VG(1) may be a high-low logic switching signal having a switching period $T_{(1)}$, and a high logic pulse and a low logic pulse in each switching period $T_{(1)}$, and may be configured to drive the first power switch Q(1) of the N power switches {Q(i), i=1, 2, . . . , N}.

In the exemplary embodiment shown in FIG. 1, for each i from 1 to N, the $i^{th}$ power stage 103(i) of the $i^{th}$ power conversion phase PHASE(i) may be configured to have a boost power factor correction ("PFC") topology. For instance, for each i from 1 to N, the $i^{th}$ power stage 103(i) may comprise the $i^{th}$ power switch Q(i) having a first terminal D coupled to the first node IN through an $i^{th}$ inductive power storage device L(i) and coupled to the second node OUT through an $i^{th}$ diode D(i), a second terminal S coupled to the third node GND, and a control terminal G coupled to the $i^{th}$ controller 102(i), e.g. with or without a gating resistive device $R_{G(i)}$. The gating resistive device $R_{G(i)}$ may comprise parasitic resistances. The first controller 102(1) configured as a master controller may comprise any controller suitable to generate a master switch driving signal (i.e. the first switch driving signal VG(1)) to drive the first power stage 103(1) having the boost PFC topology. For instance, the commercially available controller MP44018A manufactured by Monolithic Power System Inc. may be used as the first controller 102(1). In the example of FIG. 1, the first controller 102(1) may have a first terminal (e.g. a feedback terminal) FB that may be configured/used to receive a feedback signal indicative of an output voltage VO at the second node OUT of the power converter 100, a second terminal (e.g. a driver output terminal) DRV(1) that may be configured/used to provide the first switch driving signal VG(1), a third terminal (e.g. a regulated power terminal) VC(1) that may be configured/used to allow connection of a first capacitive device C(1) for storing energy to generate a regulated voltage signal VCC(1) that may be used as an internal supply voltage for the first controller 102(1), and a fourth terminal (e.g. a ground terminal) GND(1) that may be configured/used to allow connection to the third node GND (or the reference ground potential) of the power converter 100. The first controller 102(1) may at least comprise a voltage feedback loop that may be configured to generate the first switch driving signal VG(1) based at least partially on the feedback signal received at the first terminal FB. The first controller 102(1) may further comprise other terminals, for example a fifth terminal (e.g. a current sense terminal) CS(1) that may be configured/used to sense or receive a first current sense signal VCS(1) indicative of a current flowing through the first power switch Q(1) or a current flowing through the first inductive power storage device L(1). The first controller 102(1) may further be configured to regulate the first switch driving signal VG(1) based on the first current sense signal VCS(1). The first controller 102(1) may further comprise a sixth terminal (e.g. a compensation terminal) COMP that may be configured to allow connection to a compensation network (e.g. comprising a capacitor Cp in parallel connection with a series connected resistor Rz and a capacitor Cz) to improve stability of the voltage feedback loop. The first controller 102(1) may further comprise a seventh terminal (e.g. a zero-cross detection ("ZCD") terminal) ZCD(1) that may be configured/used to allow connection, e.g. through a first ZCD resistor $R_{ZCD(1)}$, to the first inductive power storage device L(1) to detect whether a current flowing through the first inductive power storage device L(1) is crossing zero (or ideally is having a zero current value). The first controller 102(1) may further comprise an eighth terminal (e.g. a power supply terminal) MAINSIN that may be configured/used to sense a rectified voltage of the AC input signal VAC and a voltage on the MAINSIN terminal may be used for providing brown-in and brownout protections and feed-forward compensation to a voltage on the COMP terminal. In the example of FIG. 1, it is exemplarily illustrated that the eighth terminal MAINSIN is coupled to the second terminal a2 of the AC source through a first input resistor $R_{IN1}$ and a first input diode $D_{IN1}$, and further coupled to the first terminal b1 or the third terminal b3 of the full bridge BD1 through the first input resistor $R_{IN1}$ and a second input diode $D_{IN2}$ to sense the rectified voltage of the AC input signal VAC. A second input capacitor $C_{IN2}$ and a second input resistor $R_{IN2}$ may be coupled in parallel between the eighth terminal MAINSIN and the third node GND of the power converter 100. The first input resistor $R_{IN1}$ and the second input resistor $R_{IN2}$ constitute a resistive voltage divider to scale down the rectified voltage of the AC input signal VAC to the voltage on the eighth terminal MAINSIN. One of ordinary skill in the art should understand that this is just to provide an example and not intended to be limiting.

For each i from 2 to N (i.e., here i is a variable traverses the integers from 2 to N), the $i^{th}$ controller 102(i) of the N controllers {102(i), i=1, 2, . . . , N} may have a first terminal (e.g. a power supply terminal) G(i) that may be configured/used to receive the $(i-1)^{th}$ switch driving signal VG(i-1) from the $(i-1)^{th}$ controller 102(i-1). The $i^{th}$ controller 102(i) may further be configured to draw power from the $(i-1)^{th}$ switch driving signal VG(i-1). That is to say, the $i^{th}$ controller 102(i) is powered by the $(i-1)^{th}$ switch driving signal VG(i-1) or operation power of the $i^{th}$ controller 102(i) is provided by the $(i-1)^{th}$ switch driving signal VG(i-1). For each i from 2 to N (i.e., here i is a variable traverses the integers from 2 to N), the $i^{th}$ controller 102(i) of the N controllers {102(i), i=1, 2, . . . , N} may be configured/used as a slave controller and may further have a second terminal (e.g. a driver output terminal) DRV(i), and may further be configured to provide an $i^{th}$ switch driving signal VG(i) at the second terminal DRV(i) based on the $(i-1)^{th}$ switch driving signal VG(i-1). One of ordinary skill in the art would understand that the $(i-1)^{th}$ switch driving signal VG(i-1) can be considered as an input switch driving signal to the $i^{th}$ controller 102(i), and the $i^{th}$ switch driving signal VG(i) can be considered as an output switch driving signal of the $i^{th}$ controller 102(i) which may be used to drive the $i^{th}$ power switch Q(i) of the $i^{th}$ power conversion phase PHASE (i), for each i from 2 to N (i.e., here i is a variable traverses the integers from 2 to N). Therefore, in the exemplary embodiment of FIG. 1, it can be understood that for each i from 2 to N (i.e., here i is a variable traverses the integers from 2 to N), the $i^{th}$ controller 102(i) on the one hand draws power from the $(i-1)^{th}$ switch driving signal VG(i-1) and on the other hand generates the $i^{th}$ switch driving signal VG(i) based on the $(i-1)^{th}$ switch driving signal VG(i-1) from the $(i-1)^{th}$ controller. For instance, the $2^{nd}$ controller 102(2) on the one hand draws power from the $1^{st}$ switch driving signal VG(1) and on the other hand generates the $2^{nd}$ switch driving signal VG(2) based on the $1^{st}$ switch driving signal VG(1) from the $1^{st}$ controller 102(1) which is configured as the master controller. For each i from 2 to N (i.e., here i is a variable traverses the integers from 2 to N), powering the $i^{th}$ controller 102(i) of the $i^{th}$ phase PHASE(i) by the $(i-1)^{th}$ switch driving signal VG(i-1) of the $(i-1)^{th}$ phase PHASE (i-1) may have several advantages. The $(i-1)^{th}$ switch driving signal VG(i-1) may be a high-low logic switching signal having a switching period $T_{(i-1)}$, and a high logic pulse and a low logic pulse in each switching period $T_{(i-1)}$, and may generally have a well-regulated voltage amplitude for instance in the range of 10V~20V relative to the reference ground potential of the power converter 100, the $i^{th}$ controller 102(i) in accordance with various embodiments of the present invention drawing power from the $(i-1)^{th}$ switch driving signal VG(i-1) may not require internal regulators that should be high voltage tolerant. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. And thus, high voltage tolerant devices are not needed, reducing complexity and cost of design of the $i^{th}$ controller 102(i).

In accordance with an embodiment of the present disclosure, for each i from 2 to N (i.e., here i is a variable traverses the integers from 2 to N), the $i^{th}$ controller 102(i) may further have a third terminal (e.g. a regulated power terminal) VC(i) and a fourth terminal (e.g. a ground terminal) GND(i), wherein the $i^{th}$ controller 102(i) may be further configured to allow connection of an $i^{th}$ capacitive device C(i) between its third terminal VC(i) and its fourth terminal GND(i) for storing energy to provide a regulated voltage signal VCC(i). For instance, when the $i^{th}$ capacitive device C(i) is coupled between the third terminal VC(i) and the fourth terminal GND(i) of the $i^{th}$ controller 102(i), it may get charged when the $(i-1)^{th}$ switch driving signal VG(i-1) is provided at the first terminal G(i) of the $i^{th}$ controller 102(i) to provide the regulated voltage signal VCC(i), for each i from 2 to N (i.e., here i is a variable traverses the integers from 2 to N).

In accordance with an embodiment of the present disclosure, for each i from 2 to N (i.e., here i is a variable traverses the integers from 2 to N), the $i^{th}$ controller 102(i) may further be configured to phase shift the $(i-1)^{th}$ switch driving signal VG(i-1) by $T_{(i-1)}/N$ to generate the $i^{th}$ switch driving signal VG(i). That is to say, theoretically and technically, for each i from 2 to N (i.e., here i is a variable traverses the integers from 2 to N), the $i^{th}$ controller 102(i) may be configured to generate the $i^{th}$ switch driving signal VG(i) by duplicating the $(i-1)^{th}$ switch driving signal VG(i-1) with a $T_{(i-1)}/N$ time delay added to the $(i-1)^{th}$ switch driving signal VG(i-1). The $i^{th}$ switch driving signal VG(i), for each i from 2 to N (i.e., here i is a variable traverses the integers from 2 to N), may thus also be a high-low logic switching signal having a switching period $T_{(i)}$ and a high logic pulse and a low logic pulse in each switching period $T_{(i)}$, and having a $T_{(i-1)}/N$ time delay from the $(i-1)^{th}$ switch driving signal VG(i-1) at every rising edge, wherein the switching period $T_{(i)}$ may be substantially equal to the switching period $T_{(i-1)}$ of the $(i-1)^{th}$ switch driving signal VG(i-1) and a pulse width $t_{on(i)}$ of the $i^{th}$ switch driving signal VG(i) may be substantially equal to a pulse width $t_{on(i-1)}$ of the $(i-1)^{th}$ switch driving signal VG(i-1). Herein, for each i from 1 to N, the pulse width $t_{on(i)}$ of the $i^{th}$ switch driving signal VG(i) may refer to a width (or a time duration) of a high logic pulse during each one switching period $T_{(i)}$ of the $i^{th}$ switch driving signal VG(i). In accordance with an exemplary embodiment, for each i from 2 to N (i.e., here i is a variable traverses the integers from 2 to N), the $i^{th}$ controller 102(i) may further comprise a fifth terminal (e.g. a setting terminal) SET(i) that may be configurable to set a phase shift of $T_{(i-1)}/N$ (i.e. the $T_{(i-1)}/N$ time delay) to the $i^{th}$ switch driving signal VG(i) from the $(i-1)^{th}$ switch driving signal VG(i-1). For instance, for each i from 2 to N (i.e., here i is a variable traverses the integers from 2 to N), the $i^{th}$ controller 102($i$) may be configured to, for example, allow customers or users to set the $T_{(i-1)}/N$ time delay by connecting an external setting device to the setting terminal SET($i$) or by providing a configuration signal to the setting terminal SET($i$).

In accordance with an embodiment of the present disclosure, for each i from 2 to N (i.e., here i is a variable traverses the integers from 2 to N), the $i^{th}$ controller 102($i$) may further have a sixth terminal (e.g. a current sense terminal) CS($i$) adapted to be used to sense or receive an $i^{th}$ current sense signal VCS($i$) which is indicative of a current flowing through the $i^{th}$ power switch Q($i$) or a current flowing through the $i^{th}$ inductive power storage device L($i$). For instance, in an application, for each i from 1 to N, the current sense terminal CS($i$) of the $i^{th}$ controller 102($i$) may be used to be coupled to the $i^{th}$ power switch Q($i$) through an $i^{th}$ current sensing apparatus 104($i$). In the exemplary embodiment shown in FIG. 1, the $i^{th}$ current sensing apparatus 104($i$) is illustrated to comprise a sensing resistor $R_{CS1(i)}$ coupled between the second terminal S of the $i^{th}$ power switch Q($i$) and the ground terminal GND($i$) of the $i^{th}$ controller 102($i$) (or the ground node GND of the power converter 100), a current sense filtering resistor $R_{CS2(i)}$ coupled between the current sense terminal CS($i$) of the $i^{th}$ controller 102($i$) and the second terminal S of the $i^{th}$ power switch Q($i$), and a current sense filtering capacitor $C_{CS(i)}$ coupled between the current sense terminal CS($i$) of the $i^{th}$ controller 102($i$) and the ground terminal GND($i$) of the $i^{th}$ controller 102($i$) (or the ground node GND of the power converter 100). This is just to provide an example and not intended to be limiting. In some embodiments, the current sense filtering resistor $R_{CS2(i)}$ and/or the current sense filtering capacitor $C_{CS(i)}$ in the above described exemplary $i^{th}$ current sensing apparatus 104($i$) may be optionally omitted, for each i from 1 to N. In other embodiments, for each i from 1 to N, the $i^{th}$ current sensing apparatus 104($i$) may comprise any other appropriate elements or circuitry that may be adapted to sample the current flowing through the $i^{th}$ power switch Q($i$) or the current flowing through the $i^{th}$ inductive power storage device L($i$). For instance, in an alternative example, the $i^{th}$ current sensing apparatus 104($i$) may comprise a current sense transistor coupled in parallel with the $i^{th}$ power switch Q($i$), for each i from 1 to N. For this situation, the $i^{th}$ controller 102($i$), the $i^{th}$ current sensing apparatus 104($i$) and the $i^{th}$ power switch Q($i$) may be integrated on a single die or co-packed in a single chip. One of ordinary skill in the art should understand that, ideally, the N current sensing apparatus {104($i$), i=1, 2, ..., N} should be matching with (e.g. identical to) each other.

In accordance with an embodiment of the present disclosure, for each i from 2 to N (i.e., here i is a variable traverses the integers from 2 to N), the $i^{th}$ controller 102($i$) may further be configured to receive the $(i-1)^{th}$ current sense signal VCS($i-1$) from the $(i-1)^{th}$ controller 102($i-1$), to detect the peak value $CSPK_{(i-1)}$ of the $(i-1)^{th}$ current sense signal VCS($i-1$) and use the peak value $CSPK_{(i-1)}$ of the $(i-1)^{th}$ current sense signal VCS($i-1$) as a current limit threshold of the $i^{th}$ controller 102($i$) which may be further adapted to be used to limit a peak current value $IPK_{(i)}$ of the current flowing through the $i^{th}$ power switch Q($i$) (or of the current flowing through the $i^{th}$ inductive power storage device L($i$)). For instance, for each i from 2 to N, the $i^{th}$ controller 102($i$) may further be adapted to be configured to compare the $i^{th}$ current sense signal VCS($i$) with the peak value $CSPK_{(i-1)}$ of the $(i-1)^{th}$ current sense signal VCS($i-1$) and to trigger the $i^{th}$ switch driving signal VG($i$) being reset at the logic low when the $i^{th}$ current sense signal VCS($i$) reaches the peak value $CSPK_{(i-1)}$ of the $(i-1)^{th}$ current sense signal VCS($i-1$). The $i^{th}$ switch driving signal VG($i$) being reset at the logic low may be adapted to turn the $i^{th}$ power switch Q($i$) off, thereby preventing the current flowing through the $i^{th}$ power switch Q($i$) (or the current flowing through the $i^{th}$ inductive power storage device L($i$)) from being further increased. In this fashion, for each i from 2 to N, the $i^{th}$ controller 102($i$) may be adapted to limit the peak current value $IPK_{(i)}$ of the current flowing through the $i^{th}$ power switch Q($i$) (or of the current flowing through the $i^{th}$ inductive power storage device L($i$)) to match with or to be substantially equal to the peak current value $IPK_{(i-1)}$ of the current flowing through the $(i-1)^{th}$ power switch Q($i-1$) (or of the current flowing through the $(i-1)^{th}$ inductive power storage device L($i-1$)) by turning the $i^{th}$ power switch Q($i$) off once the $i^{th}$ current sense signal VCS($i$) reaches the peak value $CSPK_{(i-1)}$ of the $(i-1)^{th}$ current sense signal VCS($i-1$), because the $i^{th}$ current sense signal VCS($i$) is indicative of the current flowing through the $i^{th}$ power switch Q($i$) (or of the current flowing through the $i^{th}$ inductive power storage device L($i$)), and the peak value $CSPK_{(i-1)}$ of the $(i-1)^{th}$ current sense signal VCS($i-1$) is actually indicative of a peak current value $IPK_{(i-1)}$ of the current flowing through the $(i-1)^{th}$ power switch Q($i-1$) (or of the current flowing through the $(i-1)^{th}$ inductive power storage device L($i-1$)). Therefore, the N controllers {102($i$), i=1, 2, ..., N} may regulate the power converter 100 to realize current balancing between the N power conversion phases {PHASE($i$), i=1, 2, ..., N}.

In accordance with the various embodiments of the present disclosure, except the first controller 102(1) which is a master controller, the remained (N−1) controllers {102($i$), i=2, ..., N} may be identical slave controllers (i.e. having identical terminals/pins, functions, internal circuits and configurations etc.) that are different from the master controller 102(1). For instance, each one of the slave controllers {102($i$), i=2, ..., N} may comprise an identical controller that may be formed into a single integrated circuit chip or a single integrated circuit die and may be "universally" used for co-working with any master controller to configure/form interleaving multiphase power converter of any topology, and thus may be referred to as a "universal" controller hereafter in this disclosure. This can greatly facilitate customers/users in practical applications to form a power converter of any number N(N≥2) of phases despite of the converter topology according to various application requirements. In addition, such a "universal" controller used as a slave controller, e.g. the $i^{th}$ controller 102($i$) (i from 2 to N) described above, may not require complex internal circuits to form regulation feedback loops as the master controller (e.g. the $1^{st}$ controller 102(1) described above) does, it may simply duplicate and phase-shift the $(i-1)^{th}$ switch driving signal VG($i-1$) from an immediately preceding $(i-1)^{th}$ power conversion phase PHASE($i-1$) to provide the $i^{th}$ switch driving signal VG($i$) that is used to drive the $i^{th}$ power switch Q($i$) in the $i^{th}$ power conversion phase PHASE($i$). The master controller, e.g. the $1^{st}$ controller 102(1) of the master phase PHASE(1), completes the complex regulation feedback loops. Furthermore, such a "universal" controller used as a slave controller, e.g. the $i^{th}$ controller 102($i$) (i from 2 to N) described above in the multiphase power converter 100, may not require complex circuitry to implement current sharing/current balancing between the N different power conversion phases {PHASE($i$), i=1, 2, ..., N}, it may simply detect the peak value $CSPK_{(i-1)}$ of the $(i-1)^{th}$ current sense signal VCS($i-1$) from an immediately preceding $(i-1)^{th}$ power conversion phase PHASE($i-1$) and use the peak value $CSPK_{(i-1)}$ of the $(i-1)^{th}$ current sense signal VCS($i-1$)

as a current limit threshold to limit the peak value $CSPK_{(i)}$ of the $i^{th}$ current sense signal VCS(i) which is indicative of the peak current value $IPK_{(i)}$ of the current flowing through the $i^{th}$ power switch Q(i) (or of the current flowing through the $i^{th}$ inductive power storage device L(i)) in the $i^{th}$ power conversion phase PHASE(i) and can achieve good current sharing/current balancing performance. Therefore, the "universal" controller according to various embodiments of the present invention allows more flexibility, and reduces design complexity and cost for customers/users to configure interleaving multiphase power converters.

Figure 2:
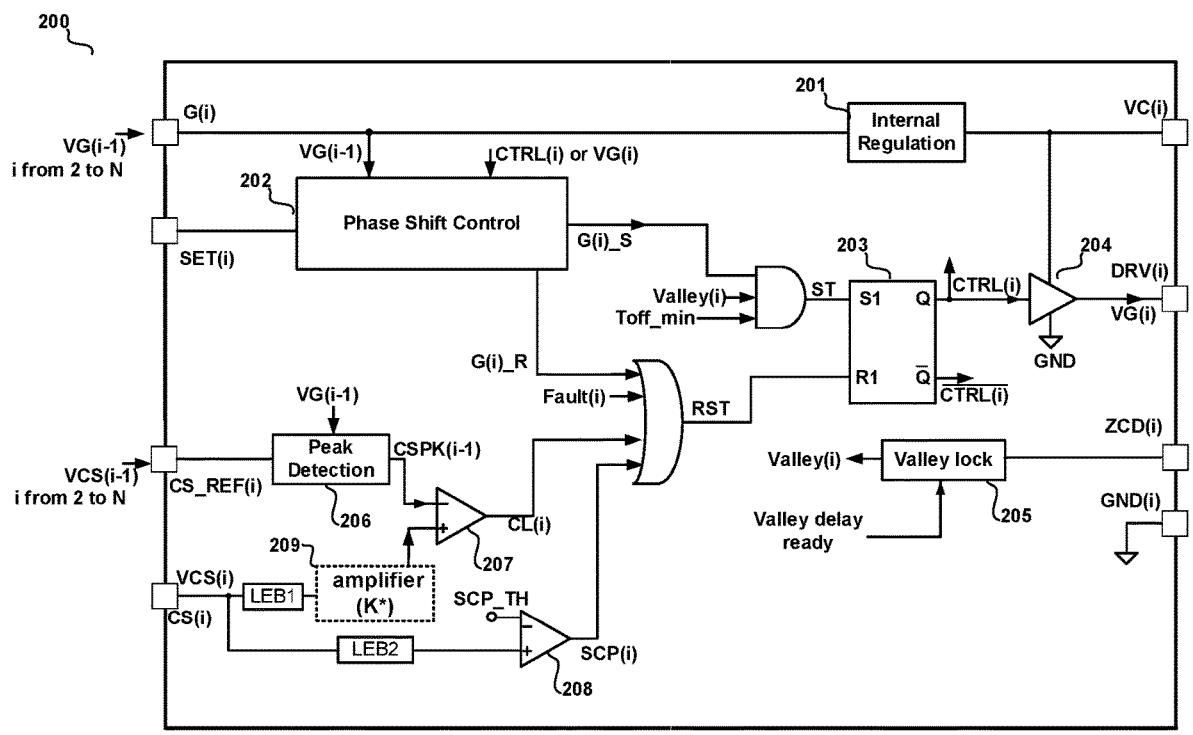
FIG. 2 schematically illustrates a controller 200 for driving a power switch in one phase of a power converter having a plurality of phases in accordance with an embodiment of the present invention.
Figure 5:
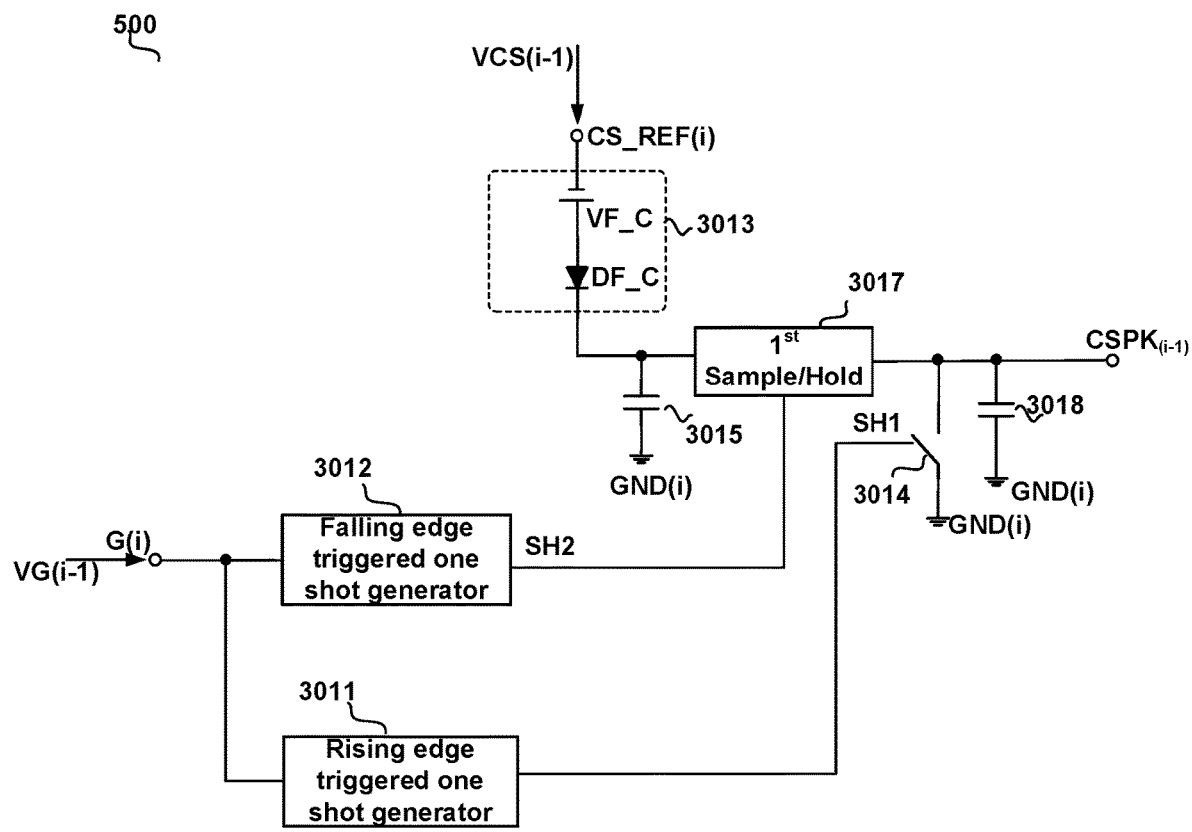
FIG. 5 schematically illustrates a peak detection module 500 that may be used as the peak detection module 206 of the controller 200 in accordance with an alternative embodiment of the present invention.

FIG. 2 schematically illustrates a controller 200 for driving a power switch in one phase of a power converter (e.g. the power converter 100 as shown in FIG. 1 or the power converter 700 as shown in FIG. 5 that will be described later) having a plurality of phases in accordance with an embodiment of the present invention. The controller 200 may be used as the "universal" controller mentioned above which may be "universally" used for co-working with any master controller to configure/form a power converter of any number N (N≥2) of phases despite of the converter topology. For example, the controller 200 may be configured as the $i^{th}$ slave controller 102(i) of the power converter 100, for each i from 2 to N (i.e., here i is a variable traverses the integers from 2 to N). Namely, for each i from 2 to N (i.e., here i is a variable traverses the integers from 2 to N), the $i^{th}$ controller 102(i) of the power converter 100 may comprise an identical controller e.g. the controller 200. The controller 200 may be formed into a single integrated circuit chip or a single integrated circuit die and may be a "universal" controller that can co-work with any master controller to configure/form interleaving multiphase power converter.

The controller 200 may have a first terminal (e.g. a power supply terminal) G(i) that may be configured/used to receive an input switch driving signal VG(i−1) which is used to drive a power switch in another phase of the power converter. The controller 200 may further have a second terminal (e.g. a driver output terminal) DRV(i) that may be configured/used to provide an output switch driving signal VG(i) to drive the power switch in the one phase. The controller 200 may be configured to draw power from the input switch driving signal VG(i−1) received at the first terminal G(i−1), and may further be configured to provide the output switch driving signal VG(i) based on the input switch driving signal VG(i−1). The controller 200 may further have a third terminal (e.g. a regulated power terminal) VC(i) and a fourth terminal (e.g. a ground terminal) GND, and may further be configured to provide a regulated voltage signal (e.g. VCC(i)) when a capacitive device (e.g. C(i)) is coupled between its third terminal VC(i) and its fourth terminal GND(i). The controller 200 may further be configured to phase shift the input switch driving signal VG(i−1) by $T_{(i-1)}/N$ to generate the output switch driving signal VG(i), wherein $T_{(i-1)}$ is a switching period of the input switch driving signal VG(i−1) and N is the total number of the plurality of phases of the power converter. That is to say, theoretically and technically, the controller 200 may be configured to generate the output switch driving signal VG(i) by duplicating the input switch driving signal VG(i−1) with a $T_{(i-1)}/N$ time delay added to the input switch driving signal VG(i−1). The controller 200 may further have a fifth terminal (e.g. a setting terminal) SET(i) that may be configurable to set the phase shift of $T_{(i-1)}/N$ (i.e. the $T_{(i-1)}/N$ time delay) to the output switch driving signal VG(i) from the input switch driving signal VG(i−1). For example, when used as the $i^{th}$ controller 102(i) for driving the $i^{th}$ power switch Q(i) of one phase (i.e. the $i^{th}$ phase) PHASE(i) of the power converter 100 in the example of FIG. 1, the controller 200 may be configured to receive the $(i-1)^{th}$ switch driving signal VG(i−1) as an input switch driving signal from the $(i-1)^{th}$ controller 102(i−1) which is used to drive the $(i-1)^{th}$ power switch Q(i−1) in another phase (i.e. the $(i-1)^{th}$ phase) PHASE(i−1) of the power converter 100, for each i from 2 to N (i.e., here i is a variable traverses the integers from 2 to N).

The controller 200 may further have a sixth terminal (e.g. a current sense terminal) CS(i) and may further be adapted to be configured to sense or receive a current sense signal VCS(i) which is indicative of a current flowing through the power switch (e.g. the $i^{th}$ power switch Q(i)) in the one phase (e.g. the $i^{th}$ phase PHASE(i)) of the power converter (e.g. the power converter 100). The controller 200 may further have a seventh terminal (e.g. a current limit terminal) CS_REF(i) that may be adapted to be configured to receive a reference current sense signal VCS(i−1) which is indicative of a current flowing through the power switch (the $(i-1)^{th}$ power switch Q(i−1)) in the another phase (e.g. the $(i-1)^{th}$ phase PHASE(i−1)) of the power converter (e.g. the power converter 100). The controller 200 may further be configured to reset the output switch driving signal VG(i), for example at logic low, once the current sense signal VCS(i) reaches a peak value $CSPK_{(i-1)}$ of the reference current sense signal VCS(i−1). The output switch driving signal VG(i) may be adapted to be used to turn off the power switch (e.g. the $i^{th}$ power switch Q(i)) in the one phase (e.g. the $i^{th}$ phase PHASE(i)) when the output switch driving signal VG(i) is reset.

In accordance with an exemplary embodiment, still referring to FIG. 2, the controller 200 may comprise an internal regulation module 201, coupled between the first terminal (e.g. the power supply terminal) G(i) and the third terminal (e.g. the regulated power terminal) VC(i) of the controller 200, and configured to convert the input switch driving signal VG(i−1) into the regulated voltage signal VCC(i) when the capacitive energy storage device (e.g. C(i)) is coupled between the third terminal (e.g. the regulated power terminal) VC(i) and the fourth terminal (e.g. the ground terminal) GND(i) of the controller 200. In an embodiment, the internal regulation module 201 may comprise for instance, a rectifier (e.g. MOSFET or diode) that is configured to be conductive in a direction from the first terminal G(i) to the third terminal VC(i) of the controller 200 and be reverse blocking (non-conductive) in a direction from the third terminal VC(i) to the first terminal G(i) of the controller 200. In an alternative embodiment, the internal regulation module 201 may comprise a regulator (e.g. LDO regulator) instead of a rectifier. Since the voltage amplitude of the input switch driving signal VG(i−1) may generally be in the range of 10V~20V relative to the reference ground potential at the third node GND of the power converter 100, the controller 200 may not require its internal regulation module 201 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the internal regulation module 201 may be comprised of low voltage devices (e.g. having break down voltages lower than the voltage amplitude of the input switch driving signal VG(i−1)). Low voltage devices are not only cost effective and size saving but also help to reduce design complexity and power dissipation.

In accordance with an exemplary embodiment, still referring to FIG. 2, the controller 200 may further comprise a phase shift control module 202, coupled to the first terminal G(i), and configured to generate a setting control signal G(i)_S and a resetting control signal G(i)_R based on the input switch driving signal VG(i−1). The setting control signal G(i)_S may be configured to set the output switch driving signal VG(i) (e.g. at logic high) in response to each rising edge of the input switch driving signal VG(i−1) with a $T_{(i-1)}/N$ time delay, and the resetting control signal G(i)_R may be configured to reset the output switch driving signal VG(i) (e.g. at logic low) in response to each falling edge of the input switch driving signal VG(i−1) with a $T_{(i-1)}/N$ time delay, wherein $T_{(i-1)}$ is the switching period of the input switch driving signal VG(i−1) and N is the total number of the plurality of phases of the power converter. That is to say, in response to each rising edge of the input switch driving signal VG(i−1), once a $T_{(i-1)}/N$ time delay has elapsed starting from the moment when the rising edge of the input switch driving signal VG(i−1) comes, the setting control signal G(i)_S may be configured to set the output switch driving signal VG(i) at logic high. In response to each falling edge of the input switch driving signal VG(i−1), once a $T_{(i-1)}/N$ time delay has elapsed starting from the moment when the falling edge of the input switch driving signal VG(i−1) comes, the resetting control signal G(i)_R may be configured to reset the output switch driving signal VG(i) at logic low. In accordance with an embodiment, the phase shift control module 202 may further be coupled to the fifth terminal (e.g. the setting terminal) SET(i) and may be configured to allow customers/users to set the phase shift of $T_{(i-1)}/N$ (i.e. the $T_{(i-1)}/N$ time delay) by connecting an external setting device to the setting terminal SET(i) or by providing a configuration signal to the setting terminal SET(i).

In accordance with an exemplary embodiment, the phase shift control module 202 may be configured to detect the switching period $T_{(i-1)}$ of the input switch driving signal VG(i−1) (e.g. the $(i-1)^{th}$ switch driving signal VG(i−1) when the controller 200 is used as the $i^{th}$ controller 102(i) of the power converter 100), and may further be configured to generate a setting pulse 401 of the setting control signal G(i)_S in response to each rising edge of the input switch driving signal VG(i−1) with a $T_{(i-1)}/N$ time delay. That is to say, starting from the moment when each rising edge of the input switch driving signal VG(i−1) comes, once a $T_{(i-1)}/N$ time delay has elapsed, the setting control module 301 generates a setting pulse 401 of the setting control signal G(i)_S. Each setting pulse 401 of the setting control signal G(i)_S may be configured to set the output switch driving signal VG(i) (e.g. the $i^{th}$ switch driving signal VG(i) when the controller 200 is used as the $i^{th}$ controller 102(i) of the power converter 100) at logic high. Namely, each setting pulse 401 of the setting control signal G(i)_S triggers a rising edge of the output switch driving signal VG(i). The setting control module 301 may further be coupled to the fifth terminal (e.g. the setting terminal) SET(i) of the controller 200 and may be configured to allow customers/users to set the phase shift of $T_{(i-1)}/N$ (i.e. the $T_{(i-1)}/N$ time delay) by connecting an external setting device to the setting terminal SET(i) or by providing a configuration signal to the setting terminal SET(i). The phase shift control module 202 may comprise any appropriate circuitry that can detect the switching period $T_{(i-1)}$ of the input switch driving signal VG(i−1) and generate a setting pulse 401 of the setting control signal G(i)_S in response to each rising edge of the input switch driving signal VG(i−1) with a $T_{(i-1)}/N$ time delay.

In accordance with an exemplary embodiment, the phase shift control module 202 may further be configured to detect a pulse width $t_{on(i-1)}$ of the of the input switch driving signal VG(i−1) (e.g. the $(i-1)^{th}$ switch driving signal VG(i−1) when the controller 200 is used as the $i^{th}$ controller 102(i) of the power converter 100), and may further be configured to generate a resetting pulse 403 of the resetting control signal G(i)_R in response to each rising edge of the output switch driving signal VG(i) (or in response to each setting pulse 401 of the setting control signal G(i)_S) with the pulse width $t_{on(i-1)}$ of the input switch driving signal VG(i−1) elapsed. That is to say, starting from the moment when each rising edge of the output switch driving signal VG(i) (or each setting pulse 401 of the setting control signal G(i)_S) comes, once a $t_{on(i-1)}$ duration that equals to the pulse width $t_{on(i-1)}$ of the input switch driving signal VG(i−1) has elapsed, the resetting control module 302 generates a resetting pulse 403 of the resetting control signal G(i)_R. Each resetting pulse 403 of the resetting control signal G(i)_R may be configured to reset the output switch driving signal VG(i) (e.g. the $i^{th}$ switch driving signal VG(i) when the controller 200 is used as the $i^{th}$ controller 102(i) of the power converter 100) at logic low. Namely, each resetting pulse 403 of the resetting control signal G(i)_R triggers a falling edge of the output switch driving signal VG(i). The the phase shift control module 202 may further comprise any appropriate circuitry that can detect the pulse width $t_{on(i-1)}$ of the input switch driving signal VG(i−1) and generate a resetting pulse 403 of the resetting control signal G(i)_R in response to each rising edge of the output switch driving signal VG(i) with a $t_{on(i-1)}$ time delay.

In accordance with an exemplary embodiment, still referring to FIG. 2, the controller 200 may further comprise a logic control module 203 and a driver 204. The logic control module 203 may be configured to at least directly or indirectly receive the setting control signal G(i)_S and the resetting control signal G(i)_R and to provide an output control signal CTRL(i) based at least partially on the setting control signal G(i)_S and the resetting control signal G(i)_R. The driver 204 may be powered by the regulated voltage signal VCC(i) and may be configured to enhance driving capability of the output control signal CTRL(i) to provide the output switch driving signal VG(i).

In an embodiment, the logic control module 203 may have a setting input terminal S1, a resetting input terminal R1, and a non-inverting output terminal Q. In an embodiment, the setting control signal G(i)_S may be directly fed to the setting input terminal S1 of the logic control module 203 and the logic control module 203 may be configured to set the output control signal CTRL(i) (or the output switch driving signal VG(i)) at logic high in response to each setting pulse 401 of the setting control signal G(i)_S. This is just exemplary and not intended to be limiting, for instance, in other embodiments, simple logic operations (such as an AND logic operation illustrated exemplarily in FIG. 2) may be performed to process the setting control signal G(i)_S and other signals that may be involved in the setting control of the output control signal CTRL(i) (or the output switch driving signal VG(i)) to provide a setting signal ST to the setting input terminal S1 of the logic control module 203. For example, in an embodiment, other signals that may be involved in the setting control of the output control signal CTRL(i) (or the output switch driving signal VG(i)) may include a valley control signal Valley(i). For this situation, the controller 200 may further comprise an eighth terminal (e.g. a zero cross detection terminal) ZCD(i) that may be coupled to the $i^{th}$ inductive power storage device L(i) of the $i^{th}$ power stage 103(i) through for example an $i^{th}$ zero-cross detection resistor $R_{ZCD(i)}$, for each i from 2 to N (i.e., here i is a variable traverses the integers from 2 to N), when the controller 200 is used for instance as the $i^{th}$ controller 102(i) of the power converter 100. The eighth terminal (e.g. the zero cross detection terminal) ZCD(i) may be configured/used to sense a zero current value of a current flowing through the $i^{th}$ inductive power storage device L(i) to provide a zero-cross indication signal and may further be configured to sense a quasi-resonant voltage valley of a voltage across on the $i^{th}$ power switch Q(i) when the controller 200 is used as the $i^{th}$ controller 102(i) for driving the $i^{th}$ power switch Q(i) of one phase (i.e. the $i^{th}$ phase) PHASE(i) of the power converter 100, for each i from 2 to N (i.e., here i is a variable traverses the integers from 2 to N). The controller 200 may further comprise a valley lock module 205 coupled to the eighth terminal (e.g. the zero cross detection terminal) ZCD(i) to receive a signal indicative of the quasi-resonant voltage valley of the voltage across on the $i^{th}$ power switch Q(i). The valley lock module 205 may be configured to lock the number of times that the voltage across on the $i^{th}$ power switch Q(i) reaches the quasi-resonant voltage valley to a predetermined number (e.g. the predetermined number may range from 1 to 7 or more depending on practical application requirements) to avoid audible noise caused by the valley of the voltage across on the $i^{th}$ power switch Q(i) jumping back and forth. In an alternative embodiment, other signals that may be involved in the setting control of the output control signal CTRL(i) (or the output switch driving signal VG(i)) may further include a minimum off time control signal Toff_min that may be configured to limit a minimum pulse width of a logic low pulse of the output control signal CTRL(i) (or the output switch driving signal VG(i)) during one switching period $T_{(i)}$. For example, when the controller 200 is used as the $i^{th}$ controller 102(i) for driving the $i^{th}$ power switch Q(i) of one phase (i.e. the $i^{th}$ phase) PHASE(i) of the power converter 100, for each i from 2 to N (i.e., here i is a variable traverses the integers from 2 to N), the minimum off time control signal Toff_min may help to limit a maximum switching frequency of the $i^{th}$ power switch Q(i) driven by the output switch driving signal VG(i) and make sure that a discharging time of the $i^{th}$ inductive power storage device L(i) to be enough. The minimum off time control signal Toff_min may also help to enhance noise immunity and prevent false triggering (e.g. false triggering of the zero-cross indication signal caused by ringing due to parasitic capacitances, inductances and resistances etc. in real circuits).

In an embodiment, the resetting control signal G(i)_R may be directly fed to the resetting input terminal R1 of the logic control module 203 and the logic control module 203 may be configured to reset the output control signal CTRL(i) (or the output switch driving signal VG(i)) at logic low in response to each resetting pulse 403 of the resetting control signal G(i)_R. This is just exemplary and not intended to be limiting, for instance, in other embodiments, simple logic operations (such as an OR logic operation illustrated exemplarily in FIG. 2) may be performed to process the resetting control signal G(i)_R and other signals that may be involved in the resetting control of the output control signal CTRL(i) (or the output switch driving signal VG(i)) to provide a resetting signal RST to the resetting input terminal R1 of the logic control module 203.

For example, in an embodiment, other signals that may be involved in the resetting control of the output control signal CTRL(i) (or the output switch driving signal VG(i)) may include a current limit signal CL(i). The controller 200 may further comprise a peak detection module 206, coupled to the current limit terminal CS_REF(i) of the controller 200, and configured to sample and hold the peak value $CSPK_{(i-1)}$ of the reference current sense signal VCS(i−1) and to output the peak value $CSPK_{(i-1)}$ of the reference current sense signal VCS(i−1). The controller 200 may further comprise a current limit module 207, coupled to the peak detection module 206 to receive the peak value $CSPK_{(i-1)}$ of the reference current sense signal VCS(i−1), and further coupled to the current sense terminal CS(i) of the controller 200 to receive the current sense signal VCS(i) indicative of the current flowing through the power switch in the one phase and further configured to compare the current sense signal VCS(i) with the peak value $CSPK_{(i-1)}$ of the reference current sense signal VCS(i−1) to provide the current limit signal CL(i) adapted to trigger reset to the output control signal CTRL(i) or the output switch driving signal VG(i) once the current sense signal VCS(i) reaches the peak value $CSPK_{(i-1)}$ of the reference current sense signal VCS(i−1). For example, when the controller 200 is used as the $i^{th}$ controller 102(i) for driving the $i^{th}$ power switch Q(i) of one phase (e.g. the $i^{th}$ phase PHASE(i)) of the power converter 100 in the example of FIG. 1, the current sense signal VCS(i) may be indicative of the current flowing through the $i^{th}$ power switch Q(i) and the reference current sense signal VCS(i−1) may be indicative of the current flowing through the $(i−1)^{th}$ power switch Q(i−1) in another phase (e.g. the $(i−1)^{th}$ phase PHASE(i−1)) of the power converter 100, for each i from 2 to N. In an embodiment, a first leading edge blanking circuit LEB1 may further be provided and coupled between the current sense terminal CS(i) of the controller 200 and the current limit module 207 so as to blank or shield the initial spikes on the current sense signal VCS(i).

In an embodiment, other signals that may be involved in the resetting control of the output control signal CTRL(i) (or the output switch driving signal VG(i)) may further include a short circuit protection signal SCP(i). For this situation, the controller 200 may further comprise a short circuit protection module 208, coupled to the current sense terminal CS(i) of the controller 200 to receive the current sense signal VCS(i) indicative of the current flowing through the power switch in the one phase and further configured to compare the current sense signal VCS(i) with a short circuit protection threshold SCP_TH to provide the short circuit protection signal SCP(i) adapted to trigger reset to the output control signal CTRL(i) or the output switch driving signal VG(i) once the current sense signal VCS(i) reaches the short circuit protection threshold SCP_TH. It may be understood that, when the controller 200 is used as the $i^{th}$ controller 102(i) for driving the $i^{th}$ power switch Q(i) of one phase (e.g. the $i^{th}$ phase PHASE(i)) of the power converter 100 in the example of FIG. 1, once the current sense signal VCS(i) reaches the short circuit protection threshold SCP_TH, the controller 200 determines (e.g. through the short circuit protection module 208) that a short circuit condition occurs in the one phase (e.g. the $i^{th}$ phase PHASE(i)) and thus reset the output control signal CTRL(i) or the output switch driving signal VG(i) to turn off the $i^{th}$ power switch Q(i) of the one phase (e.g. the $i^{th}$ phase PHASE(i)), for each i from 2 to N. In an embodiment, a second leading edge blanking circuit LEB2 may further be provided and coupled between the current sense terminal CS(i) of the controller 200 and the short circuit protection module 208 so as to blank or shield the initial spikes on the current sense signal VCS(i).

In an embodiment, other signals that may be involved in the resetting control of the output control signal CTRL(i) (or the output switch driving signal VG(i)) may further include a fault indication signal Fault(i). For example, the fault indication signal Fault(i) may be indicative of any other type of abnormal conditions of a power converter system (e.g. the power converter 100 when the controller 200 is used as the $i^{th}$ controller 102(i), i from 2 to N), such as an over voltage condition, an over current condition, an over temperature condition, a system idle condition, and etc.

Figure 3:
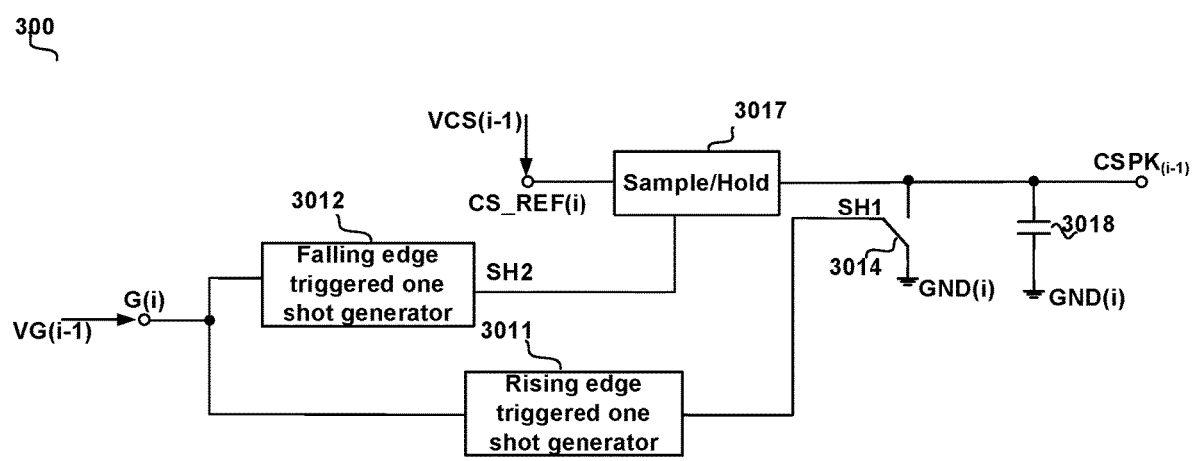
FIG. 3 schematically illustrates a peak detection module 300 that may be used as the peak detection module 206 of the controller 200 in accordance with an embodiment of the present invention.
Figure 4:
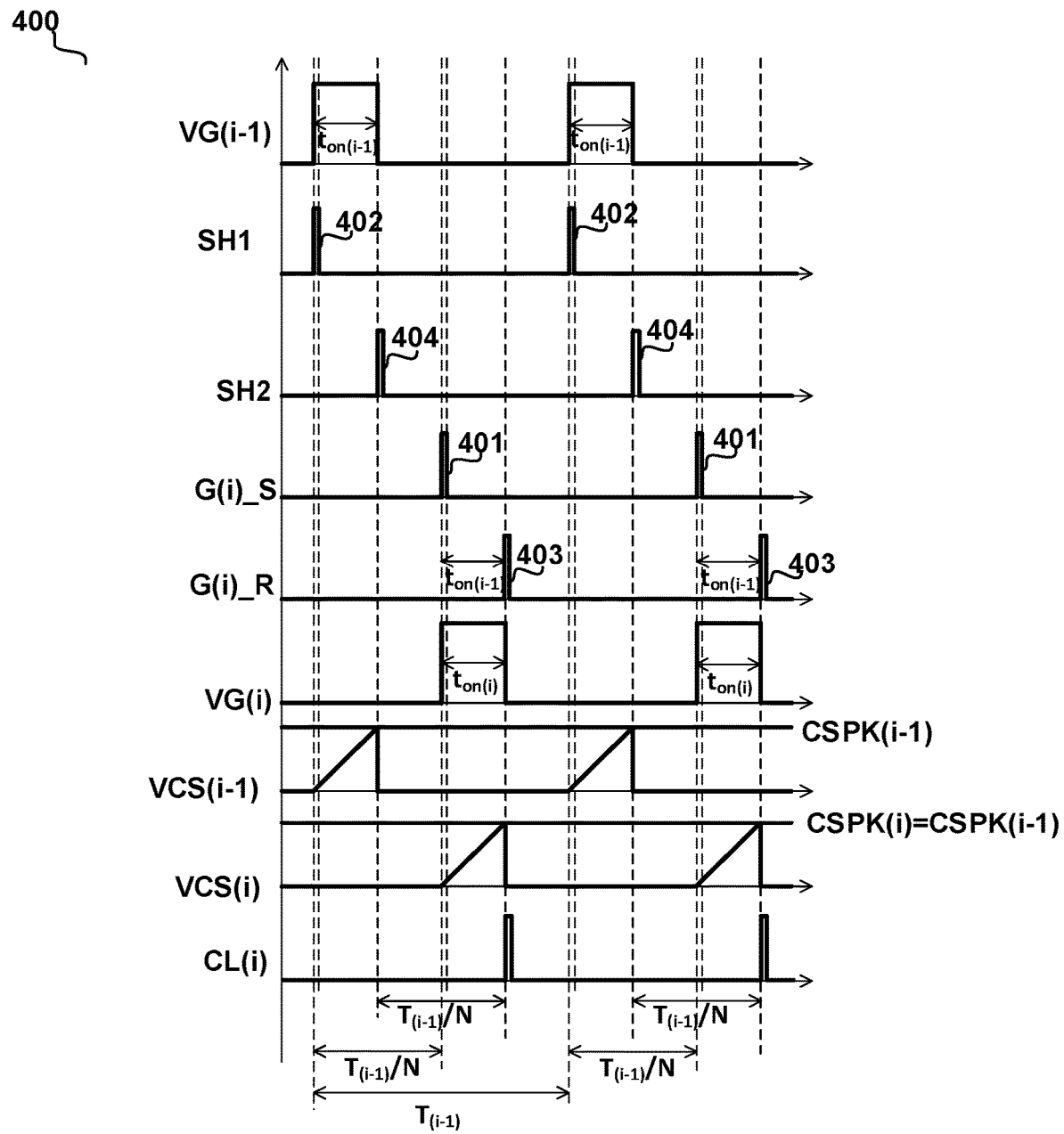
FIG. 4 illustrates a waveform diagram 400 showing waveforms of several signals in the peak detection module 300 and the controller 200, in accordance with an embodiment of the present invention.

FIG. 3 schematically illustrates a peak detection module 300 that may be used as the peak detection module 206 of the controller 200 in accordance with an embodiment of the present invention. FIG. 4 illustrates a waveform diagram 400 showing waveforms of several signals in the peak detection module 300 and the controller 200, in accordance with an embodiment of the present invention.

To provide an example as shown in FIG. 3, the peak detection module 300 may comprise a rising edge triggered one shot generator 3011 configured to generate a one shot pulse 402 in response to each rising edge of the input switch driving signal VG(i-1) to provide a first sample control signal SH1. The first sample control signal SH1 thus has a one shot pulse 402 at each rising edge of the input switch driving signal VG(i-1). The peak detection module 300 may further comprise a sample control switch 3014, coupled between an output terminal of the peak detection module 300 and the ground terminal GND(i) of the controller 200, and the sample control switch 3014 may have a control terminal configured to receive the first sample control signal SH1. Therefore, at each rising edge of the input switch driving signal VG(i-1), a one shot pulse 402 of the first sample control signal SH1 turns the sample control switch 3014 on for a very short time (e.g. during the pulse width of the one shot pulse 402) to discharge the output terminal of the peak detection module 300 so as to clear charges at the output terminal of the peak detection module 300. The peak detection module 300 may further comprise a falling edge triggered one shot generator 3012 configured to generate a one shot pulse 404 in response to each falling edge of the input switch driving signal VG(i-1) to provide a second sample control signal SH2. The second sample control signal SH2 thus has a one shot pulse 404 at each falling edge of the input switch driving signal VG(i-1). The peak detection module 300 may further comprise a sample and hold circuit 3017 that may be coupled to the current limit terminal CS_REF(i) to receive the reference current sense signal VCS(i-1) at an input terminal of the sample and hold circuit 3017, to receive the second sample control signal SH2 at a control terminal of the sample and hold circuit 3017, and to be coupled to a holding capacitor 3018 at an output terminal of the sample and hold circuit 3017. The sample and hold circuit 3017 samples the voltage amplitude of the reference current sense signal VCS(i-1) in response to each one shot pulse 404 of the second sample control signal SH2, which may be understood as that the sample and hold circuit 3017 samples the voltage amplitude of the reference current sense signal VCS(i-1) at each falling edge of the input switch driving signal VG(i-1), and then holds the sampled voltage amplitude to provide the peak value $CSPK_{(i-1)}$ of the reference current sense signal VCS(i-1) at the output terminal of the sample and hold circuit 3017 which may function as the output terminal of the peak detection module 300. In this fashion, the peak detection module 300 can refresh and hold the peak value $CSPK_{(i-1)}$ of the reference current sense signal VCS(i-1) in every switching cycle or switching period $T_{(i-1)}$ of the input switch driving signal VG(i-1).

Figure 6:
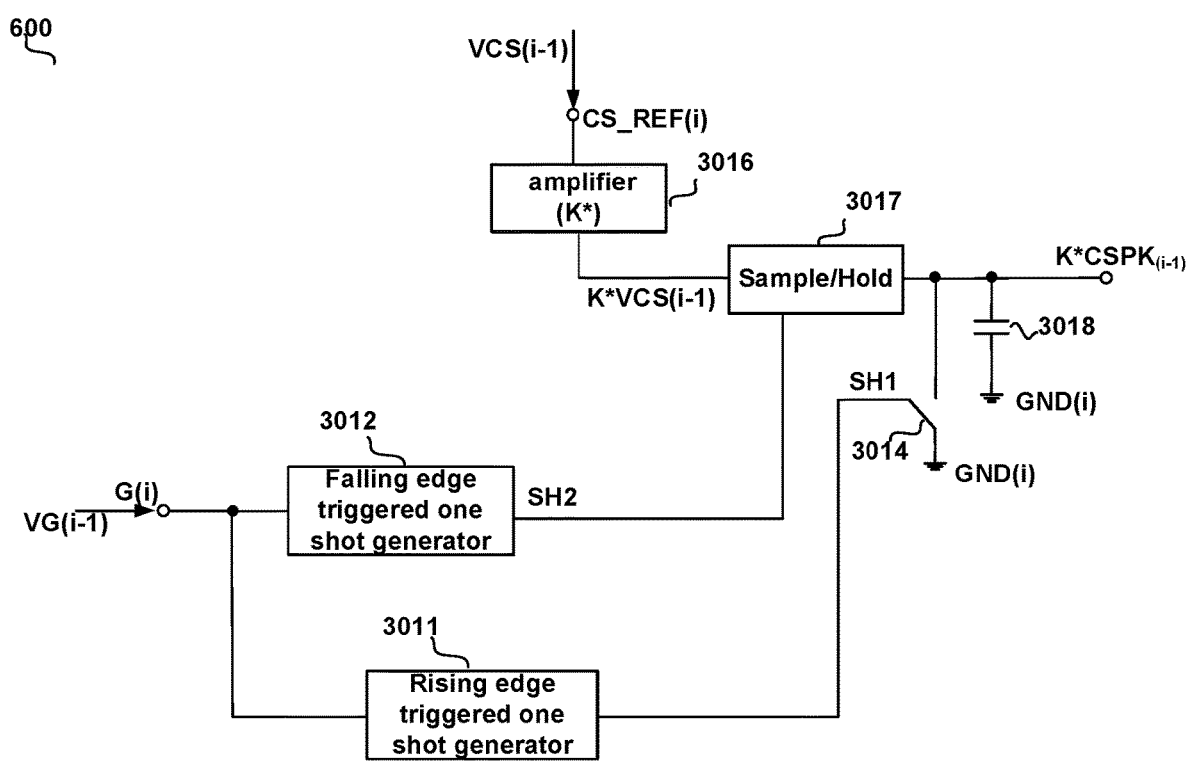
FIG. 6 schematically illustrates a peak detection module 600 that may be used as the peak detection module 206 of the controller 200 in accordance with an alternative embodiment of the present invention.

To provide another example, FIG. 5 schematically illustrates a peak detection module 500 that may be used as the peak detection module 206 of the controller 200 in accordance with an alternative embodiment of the present invention. Compared with the peak detection module 300 of FIG. 3, the peak detection module 500 is different from the peak detection module 300 only in that it may further comprise a noise immunizing circuit 3013 and a capacitor 3015. The noise immunizing circuit 3013 may be coupled between the current limit terminal CS_REF(i) of the controller 200 and the input terminal of the sample and hold circuit 3017, and may be configured to transmit the reference current sense signal VCS(i-1) from the current limit terminal CS_REF(i) to the sample and hold circuit 3017 while reverse blocking signal transmission from the sample and hold circuit 3017 to the current limit terminal CS_REF(i). The capacitor 3015 may be coupled between the input terminal of the sample and hold circuit 3017 and the ground terminal GND(i). Therefore, at each rising edge of the input switch driving signal VG(i-1), a one shot pulse 402 of the first sample control signal SH1 turns the sample control switch 3014 on to discharge the output terminal of the peak detection module 500. In the example of FIG. 5, the peak detector 3013 is exemplarily illustrated to comprise a compensation voltage source having a predetermined voltage value VF_C and a diode DF_C. The compensation voltage source having a first terminal coupled to the current limit terminal CS_REF(i) and a second terminal coupled to an anode of the diode DF_C, and a cathode of the diode DF_C may be coupled to the input terminal of the sample and hold circuit 3017. However, this is just an example and not intended to be limiting. One of ordinary skill in the art should understand that the peak detector 3013 may help to improve noise immunity performance of the peak detection module 500 and may have a variety of implementation configurations. To provide still another example, FIG. 6 schematically illustrates a peak detection module 600 that may be used as the peak detection module 206 of the controller 200 in accordance with an alternative embodiment of the present invention. Compared with the peak detection module 300 of FIG. 3, the peak detection module 600 is different from the peak detection module 300 only in that it may further comprise an amplifier 3016 having a predetermined gain K coupled between the current limit terminal CS_REF(i) of the controller 200 and the input terminal of the sample and hold circuit 3017. The amplifier 3016 may help to improve the noise immunity performance of the peak detection module 600 and minimize influence from circuit components tolerance. For this situation, the controller 200 may further comprise an amplifier 209 having the predetermined gain K which is matching with the amplifier 3016, the amplifier 209 (illustrated with dashed line in FIG. 2 to indicate that the amplifier 209 is optional and applicable for the embodiment using the peak detection module 600) in this example may be coupled between the current sense terminal CS(i) of the controller 200 and the current limit module 207.

One of ordinary skill in the art should understand that the peak detection modules 300, 500 and 600 described here with reference to FIG. 3, FIG. 5 and FIG. 6 are just exemplary and not intended to be limiting. Many modifications and variations to the peak detection module (e.g. 300 or 500 or 600) that may be used as the peak detection module 206 of the controller 200 are possible in light of the above teachings. The peak detection module 206 may comprise any appropriate circuitry that can sample and refresh the peak value $CSPK_{(i-1)}$ of the reference current sense signal VCS(i−1) in every switching cycle or switching period $T_{(i-1)}$ of the input switch driving signal VG(i−1), and to provide the switching cycle by switching cycle refreshed peak value $CSPK_{(i-1)}$ of the reference current sense signal VCS(i−1) to the current limit module 207. That is to say, when the controller 200 is used as the $i^{th}$ controller 102(i) for driving the $i^{th}$ power switch Q(i) of one phase (e.g. the $i^{th}$ phase PHASE(i)) of the power converter 100 in the example of FIG. 1, for each i from 2 to N, the peak detection module 206 may be adapted to be configured to discharge the output terminal of the peak detection module 206 in response to each moment when the $(i-1)^{th}$ power switch Q(i−1) is turned on, and may be further adapted to be configured to sample the $(i-1)^{th}$ current sense signal VCS(i−1) in response to each moment when the $(i-1)^{th}$ power switch Q(i−1) is turned off to provide the peak value $CSPK_{(i-1)}$ of the $(i-1)^{th}$ current sense signal to the current limit module 207. One of ordinary skill in the art should also understand that the terms "first", "second", "third", "fourth", "fifth" when mentioned in the above descriptions related to FIG. 3 to FIG. 6 do not refer to any order/sequence but are just used to distinguish different circuit elements and different signals from each other.

Figure 7:
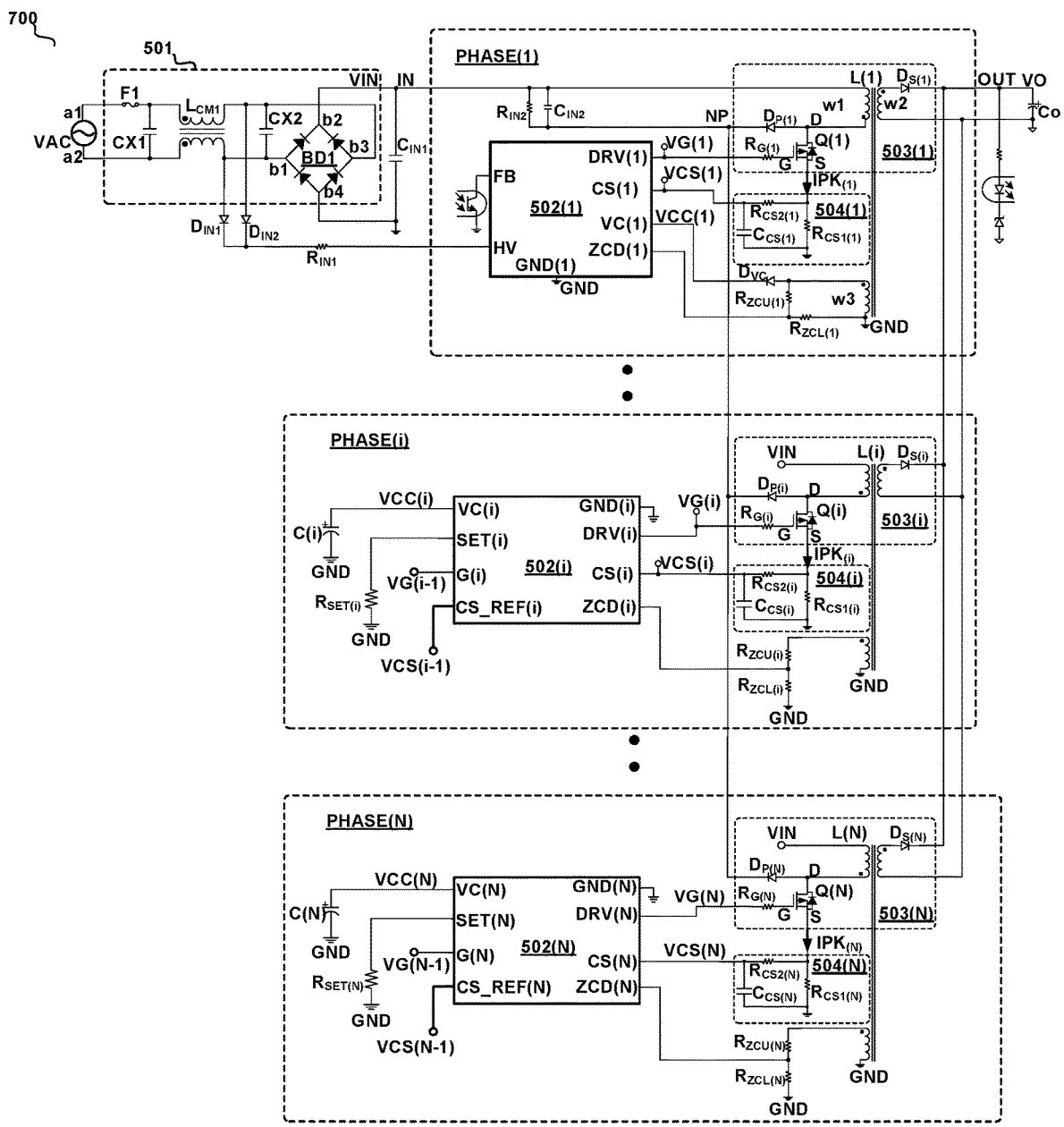
FIG. 7 schematically illustrates a power converter 700 in accordance with another exemplary embodiment of the present invention.

FIG. 7 schematically illustrates a power converter 700 in accordance with another exemplary embodiment of the present invention using the "universal" controller (such as the controller 200) as slave controllers to co-work with a master controller 502(1). Similar to the power converter 100 shown in FIG. 1, the power converter 700 in FIG. 7 may include a rectification unit 501 for rectifying an alternating current ("AC") input signal VAC to output a rectified direct current ("DC") supply signal VIN, and a plurality of N power conversion phases {PHASE(i), i=1, 2, . . . , N} coupled in parallel between a first node (e.g. a DC input node) IN and a second node (e.g. an output node) OUT, wherein N is an integer greater than 1 and represents the total number of power conversion phases that the power converter 700 may include which may be set or determined by customers/users in practical applications depending on real application requirements. That is to say, the index i is a variable traverses the integers from 1 to N. Each one of the plurality of (e.g. N) power conversion phases (including all the sub-circuits and elements that each power conversion phase may comprise) may be configured to use a reference ground potential at a third node GND of the power converter 700 as a ground potential of each power conversion phase. An input capacitor $C_{IN1}$ may be coupled across the first node IN and the third node GND of the power converter 700. The first node IN may be configured to receive the rectified DC supply signal VIN in an embodiment. An output capacitor Co may be coupled across the second node OUT and the third node GND of the power converter 700.

In the example of FIG. 7, the rectification unit 501 may exemplarily comprise four diodes connected into a full bridge BD1 having a first terminal b1 coupled to a first winding of an inductive device (e.g. a transformer) $L_{CM1}$, a second terminal b2 connected to the first node IN, a third terminal b3 connected to a second winding of the inductive device $L_{CM1}$ and a fourth terminal b4 connected to the third node GND of the power converter 700. For the rectification unit 501, a first terminal a1 of an AC source may be coupled to the second winding of the inductive device $L_{CM1}$ via a fuse F1, and a second terminal a2 of the AC source may be coupled to the first winding of the inductive device $L_{CM1}$, a capacitive device CX1 may be coupled between the first terminal a1 and the second terminal a2 of the AC source, and another capacitive device CX2 may be coupled between the first terminal b1 and the third terminal b3 of the full bridge BD1. The AC source may be configured to provide the AC input signal VAC.

Similar as the power converter 100, for each i from 1 to N, the $i^{th}$ power conversion phase PHASE(i) of the N power conversion phases {PHASE(i), i=1, 2, . . . , N} of the power converter 700 may comprise an $i^{th}$ power stage 503(i) including an $i^{th}$ power switch Q(i) and a corresponding $i^{th}$ controller 502(i) for driving the $i^{th}$ power switch Q(i) to perform on and off switching. Therefore, it would be understood that the power converter 700 having the N power conversion phases {PHASE(i), i=1, 2, . . . , N} may include N power switches {Q(i), i=1, 2, . . . , N} and N controllers {502(i), i=1, 2, . . . , N}, with each one of the N controllers {502(i), i=1, 2, . . . , N} configured to drive a corresponding one of the N power switches {Q(i), i=1, 2, . . . , N} in a corresponding one of the N power conversion phases {PHASE(i), i=1, 2, . . . , N}. In an embodiment, the first power conversion phase PHASE(1) of the N power conversion phases {PHASE(i), i=1, 2, . . . , N} may be configured as a master phase, and the first controller 502(1) of the N controllers {502(i), i=1, 2, . . . , N} may be configured as a master controller to provide a first switch driving signal VG(1). The first switch driving signal VG(1) may be a high-low logic switching signal having a switching period $T_{(1)}$, and a high logic pulse and a low logic pulse in each switching period $T_{(1)}$, and may be configured to drive the first power switch Q(1) of the N power switches {Q(i), i=1, 2, . . . , N}.

In the exemplary embodiment shown in FIG. 7, for each i from 1 to N, the $i^{th}$ power stage 503(i) of the $i^{th}$ power conversion phase PHASE(i) may be configured to have a flyback topology. For instance, for each i from 1 to N, the $i^{th}$ power stage 503(i) may comprise the $i^{th}$ power switch Q(i) having a first terminal D coupled to the first node IN through a primary winding w1 of an $i^{th}$ inductive power storage device L(i), a second terminal S coupled to the third node GND, and a control terminal G coupled to the $i^{th}$ controller 502(i) e.g. with or without a gating resistive device $R_{G(i)}$ The gating resistive device $R_{G(i)}$ may comprise parasitic resistances. In an embodiment, for each i from 1 to N, the first terminal D of the $i^{th}$ power switch Q(i) may further be coupled to a node NP through an $i^{th}$ primary diode $DP_{(i)}$ the node NP being connected to the first node IN of the power converter 700 through a second input capacitor $C_{IN2}$ and a second input resistor $R_{IN2}$ connected in parallel between the first node IN and the node NP. A secondary winding w2 of the $i^{th}$ inductive power storage device L(i) may be coupled to the second node OUT of the power converter 700 through for example an $i^{th}$ secondary diode $D_{S(i)}$ for each i from 1 to N. The first controller 502(1) configured as a master controller may comprise any controller suitable to generate a master switch driving signal (i.e. the first switch driving signal VG(1)) to drive the first power stage 503(1) having the flyback topology. For instance, the commercially available controller MPX2001/2/3, HFC0300, HFC0310, HFC0500, HFC0650 manufactured by Monolithic Power System Inc. may be used as the first controller 502(1). In the example of FIG. 7, the first controller 502(1) may have a first terminal (e.g. a feedback terminal) FB that may be configured/used to receive a feedback signal indicative of an output voltage (also labeled with VO for brevity) at the second node OUT of the power converter 700, a second terminal (e.g. a driver output terminal) DRV(1) that may be configured/used to provide the first switch driving signal VG(1), a third terminal (e.g. a regulated power terminal)

VC(1) that may be configured/used to allow connection to an auxiliary winding w3 of the first inductive power storage device L(1) for drawing energy to generate a regulated voltage signal VCC(1) that may be used as an internal supply voltage for the first controller 502(1), and a fourth terminal (e.g. a ground terminal) GND that may be configured/used to allow connection to the reference ground potential of the power converter 700. A diode $D_{VC}$ may be coupled between the third terminal VC(1) of the first controller 502(1) and the auxiliary winding w3 of the first inductive power storage device L(1) to prevent reverse charging from the third terminal VC(1) to the auxiliary winding w3. The first controller 502(1) may at least comprise a voltage feedback loop that may be configured to generate the first switch driving signal VG(1) based at least partially on the feedback signal received at the first terminal FB. The first controller 502(1) may further comprise other terminals, for example a fifth terminal (e.g. a current sense terminal) CS(1) that may be configured/used to sense or receive a first current sense signal VCS(1) indicative of a current flowing through the first power switch Q(1) or a current flowing through the first inductive power storage device L(1). For this situation, a first current sense resistor $R_{S1}$ may be coupled between the fifth terminal CS of the first controller 502(1) and the second terminal S of the first power switch Q(1), and a second current sense resistor $R_{S2}$ may be coupled between the second terminal S of the first power switch Q(1) and the third node GND of the power converter 700. The first controller 502(1) may further be configured to regulate the first switch driving signal VG(1) based on the first current sense signal VCS(1). The first controller 502(1) may further comprise a sixth terminal (e.g. a zero-cross detection ("ZCD") terminal) ZCD(1) that may be configured/used to allow connection e.g. through a first ZCD resistor $R_{ZCL(1)}$ to the auxiliary winding w3 of the first inductive power storage device L(1) to detect whether a current flowing through the first inductive power storage device L(1) crosses zero. A resistor $R_{ZCL(1)}$ may be coupled between the diode DVC and the first ZCD resistor $R_{ZCL(1)}$. The first controller 102(1) may further comprise a seventh terminal (e.g. a power supply terminal) HV that may be configured/used to sense a rectified voltage of the AC input signal VAC and a voltage on the seventh terminal HV may be used for providing brown-in and brownout protections, high voltage start-up and X-cap discharging functions for AC-DC applications. In the example of FIG. 1, it is exemplarily illustrated that the seventh terminal HV is coupled to the first winding of the inductive device $L_{CM1}$ through a first input resistor $R_{IN1}$ and a first input diode $D_{IN1}$, and further coupled to the first terminal b1 or the third terminal b3 of the full bridge BD1 through the first input resistor $R_{IN1}$ and a second input diode $D_{IN2}$ to sense the rectified voltage of the AC input signal VAC. One of ordinary skill in the art should understand that this is just to provide an example and not intended to be limiting.

In the exemplary embodiment shown in FIG. 7, for each i from 2 to N (i.e., here i is a variable traverses the integers from 2 to N), the $i^{th}$ controller 502(i) of the N controllers {502(i), i=1, 2, . . . , N} may be configured/used as a slave controller and may comprise the same structures and have similar functions as the $i^{th}$ controller 102(i) described with reference to FIG. 1. Thus, for each i from 2 to N (i.e., here i is a variable traverses the integers from 2 to N), all the descriptions to the $i^{th}$ controller 102(i) of the power converter 100 apply for the $i^{th}$ controller 502(i) of the power converter 700 and will not be repeated here.

In the exemplary embodiment shown in FIG. 7, for each i from 1 to N, the current sense terminal CS(i) of the $i^{th}$ controller 502(i) may be used to be coupled to the $i^{th}$ power switch Q(i) through an $i^{th}$ current sensing apparatus 504(i). For each i from 1 to N, the $i^{th}$ current sensing apparatus 504(i) may comprise the same structures and have similar functions as the $i^{th}$ current sensing apparatus 104(i) described with reference to FIG. 1 and will not be repeated here. One of ordinary skill in the art should understand that, ideally, the N current sensing apparatus {504(i), i=1, 2, . . . , N} should be matching with (e.g. identical to) each other.

In the exemplary embodiment shown in FIG. 7, when the controller 200 is used for instance as the $i^{th}$ controller 502(i) of the power converter 700, for each i from 2 to N, the eighth terminal (e.g. the zero cross detection terminal) ZCD(i) may be coupled to the $i^{th}$ inductive power storage device L(i) of the $i^{th}$ power stage 503(i) through for example an auxiliary winding of the $i^{th}$ inductive power storage device L(i). In the example of FIG. 7, for each i from 2 to N (i.e., here i is a variable traverses the integers from 2 to N), it is exemplarily illustrated that the an $i^{th}$ upper zero-cross detection resistor $R_{ZCU(i)}$ and an $i^{th}$ lower zero-cross detection resistor $R_{ZCL(i)}$ may further be coupled in series between a first terminal and a second terminal of the auxiliary winding of the $i^{th}$ inductive power storage device L(i), wherein the second terminal of the auxiliary winding of the $i^{th}$ inductive power storage device L(i) may be connected to the ground node GND of the power converter 700, and wherein the eighth terminal (e.g. the zero cross detection terminal) ZCD(i) of the $i^{th}$ controller 502(i) may be connected to a common connection of the $i^{th}$ upper zero-cross detection resistor $R_{ZCU(i)}$ and the $i^{th}$ lower zero-cross detection resistor $R_{ZCL(i)}$ The eighth terminal (e.g. the zero cross detection terminal) ZCD(i) may be configured/used to sense a zero current value of a current flowing through the $i^{th}$ inductive power storage device L(i) to provide a zero-cross indication signal and may further be configured to sense a quasi-resonant voltage valley of a voltage across on the $i^{th}$ power switch Q(i) when the controller 200 is used as the $i^{th}$ controller 502(i) for driving the $i^{th}$ power switch Q(i) of one phase (i.e. the $i^{th}$ phase) PHASE(i) of the power converter 700, for each i from 2 to N (i.e., here i is a variable traverses the integers from 2 to N).

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

In some embodiments, for each i from 1 to N, the diodes $D_{(i)}$ in FIG. 1 and $DP_{(i)}$ and $D_{S(i)}$ in FIG. 7 could be controllable rectifier switches, and the power switches Q(i) in the power stages 103(i) and 503(i) can be controllable semiconductor devices other than MOSFETs. Those skilled in the art can also understand that, in addition to the flyback and boost PFC topologies shown in the foregoing embodiments, some other interleaving multiphase power converters can also adopt the "universal" controller 200 as slave controller, without departing from the scope of the present invention.

What is claimed is:

1. A power converter comprising:
a plurality of N controllers, wherein each one of the N controllers is configured to drive a corresponding one power switch, and wherein N is an integer greater than 1; and wherein
a first controller of the plurality of N controllers is configured as a master controller having a current sense terminal to sense/receive a first current sense signal indicative of a current flowing through the corresponding first power switch; and wherein
for each i from 2 to N, an $i^{th}$ controller of the plurality of N controllers has a current sense terminal and a current limit terminal, wherein the current sense terminal of the $i^{th}$ controller is configured to sense/receive an $i^{th}$ current sense signal indicative of a current flowing through the corresponding $i^{th}$ power switch;
and wherein the current limit terminal of the $i^{th}$ controller is configured to receive an $(i-1)^{th}$ current sense signal indicative of a current flowing through the corresponding $(i-1)^{th}$ power switch, and wherein the $i^{th}$ controller includes a peak detection module configured to sample and hold a peak value of the $(i-1)^{th}$ current sense signal and to output the peak value of the $(i-1)^{th}$ current sense signal; and
wherein the $i^{th}$ controller further includes a current limit module, configured to receive the peak value of the $(i-1)^{th}$ current sense signal and the $i^{th}$ current sense signal, and further configured to compare the $i^{th}$ current sense signal with the peak value of the $(i-1)^{th}$ current sense signal to provide an $i^{th}$ current limit signal to trigger turn off of the corresponding $i^{th}$ power switch once the $i^{th}$ current sense signal reaches the peak value of the $(i-1)^{th}$ current sense signal.

2. The power converter of claim 1, wherein:
for each i from 2 to N, the current sense terminal of the $i^{th}$ controller is coupled to the corresponding $i^{th}$ power switch through an $i^{th}$ current sensing apparatus, and wherein the $i^{th}$ current sensing apparatus is configured to sense the current flowing through the corresponding $i^{th}$ power switch.

3. The power converter of claim 2, wherein:
for each i from 2 to N, the $i^{th}$ controller is further configured to sample the $(i-1)^{th}$ current sense signal at each falling edge of an $(i-1)^{th}$ switch driving signal to provide the peak value of the $(i-1)^{th}$ current sense signal.

4. The power converter of claim 1, wherein:
the first controller is further configured to provide a first switch driving signal at a driver output terminal of the first controller, and wherein;
for each i from 2 to N, the i controller is further configured to receive an $(i-1)^{th}$ switch driving signal from an $(i-1)^{th}$ controller at a power supply terminal of the $i^{th}$ controller, and is further configured to provide an $i^{th}$ switch driving signal at a driver output terminal of the $i^{th}$ controller based on the $(i-1)^{th}$ switch driving signal.

5. The power converter of claim 4, wherein:
for each i from 2 to N, the $i^{th}$ controller is further configured to draw power from the $(i-1)^{th}$ switch driving signal.

6. The power converter of claim 4, wherein:
for each i from 2 to N, the $i^{th}$ controller is further configured to compare the $i^{th}$ current sense signal with the peak value of the $(i-1)^{th}$ current sense signal and to reset the $i^{th}$ switch driving signal once the $i^{th}$ current sense signal reaches the peak value of the $(i-1)^{th}$ current sense signal.

7. The power converter of claim 4, wherein for each i from 2 to N, the $i^{th}$ controller is further configured to phase shift the $(i-1)^{th}$ switch driving signal by $T_{(i-1)}/N$ to generate the $i^{th}$ switch driving signal, wherein $T_{(i-1)}$ is a switching period of the $(i-1)^{th}$ switch driving signal.

8. The power converter of claim 4, wherein for each i from 2 to N, the $i^{th}$ controller further comprises:
a phase shift control module, coupled to a first terminal of the $i^{th}$ controller, and configured to generate a setting control signal and a resetting control signal based on the $(i-1)^{th}$ switch driving signal, wherein the setting control signal is configured to set the $i^{th}$ switch driving signal at logic high in response to each rising edge of the $(i-1)^{th}$ switch driving signal with a $T_{(i-1)}/N$ delay, and wherein the resetting control signal is configured to reset the $i^{th}$ switch driving signal at logic low in response to each falling edge of the $(i-1)^{th}$ switch driving signal with a $T_{(i-1)}/N$ delay, and wherein $T_{(i-1)}$ is a switching period of the $(i-1)^{th}$ switch driving signal.

9. The power converter of claim 4, wherein for each i from 2 to N, the $i^{th}$ controller further comprises:
a setting terminal, configurable to set a phase shift of $T_{(i-1)}/N$ to the $i^{th}$ switch driving signal from the $(i-1)^{th}$ switch driving signal, and wherein $T_{(i-1)}$ is a switching period of the $(i-1)^{th}$ switch driving signal.

10. The power converter of claim 1, wherein the peak detection module is further configured to discharge the output terminal of the peak detection module in response to each moment when the $(i-1)^{th}$ power switch is turned on, and is further configured to sample the $(i-1)^{th}$ current sense signal in response to each moment when the $(i-1)^{th}$ power switch is turned off to provide the peak value of the $(i-1)^{th}$ current sense signal.

11. The power converter of claim 1, wherein the peak detection module further comprises:
a rising edge triggered one shot generator, configured to generate a one shot pulse in response to each moment when the $(i-1)^{th}$ power switch is turned on to provide a first sample control signal;
a sample control switch, coupled between an output terminal of the peak detection module and a ground terminal of the $i^{th}$ controller, the sample control switch having a control terminal configured to receive the first sample control signal;
a falling edge triggered one shot generator, configured to generate a one shot pulse in response to each moment when the $(i-1)^{th}$ power switch is turned off to provide a second sample control signal; and
a sample and hold circuit, coupled to the current limit terminal of the $i^{th}$ controller to receive the $(i-1)^{th}$ current sense signal at an input terminal of the sample and hold circuit, coupled to the falling edge triggered one shot generator to receive the second sample control signal at a control terminal of the sample and hold circuit, and coupled to a holding capacitor at an output terminal of the sample and hold circuit to provide the peak value of the $(i-1)^{th}$ current sense signal at the output terminal of the sample and hold circuit.

12. A controller for driving a power switch in one phase of a plurality of phases of a power converter, the controller comprising:

a current sense terminal, configured to sense/receive a current sense signal indicative of a current flowing through the power switch in the one phase; and a current limit terminal, configured to receive a reference current sense signal indicative of a current flowing through a power switch in another phase of the plurality of phases of the power converter;

a power supply terminal, configured to receive an input switch driving signal which is used to drive the power switch in the another phase; and a driver output terminal, configured to provide an output switch driving signal which is used to drive the power switch in the one phase; wherein the controller is configured to detect a peak value of the reference current sense signal, and is further configured to reset the output switch driving signal once the current sense signal reaches the peak value of the reference current sense signal; and wherein the controller is further configured to draw power from the input switch driving signal, and is further configured to provide the output switch driving signal based on the input switch driving signal.

13. The controller of claim 12, wherein the controller is further configured to phase shift the input switch driving signal by $T_{(i-1)}/N$ to generate the output switch driving signal, wherein T(i−1) is a switching period of the input switch driving signal, and wherein N is a total number of the plurality of phases of the power converter.

14. The controller of claim 12, wherein the one phase is an $i^{th}$ phase of the plurality of phases of the power converter, and wherein the another phase is an $(i-1)^{th}$ phase of the plurality of phases of the power converter, and wherein i is an integer from 2 to N, and wherein N is an integer greater than 1 and representing a total number of the plurality of phases of the power converter.

15. The controller of claim 12, further comprising:

a peak detection module, coupled to the current limit terminal of the controller, and configured to sample and hold the peak value of the reference current sense signal and to output the peak value of the reference current sense signal; and a current limit module, coupled to the peak detection module to receive the peak value of the reference current sense signal, and further coupled to the current sense terminal of the controller to receive the current sense signal indicative of the current flowing through the power switch in the one phase, and further configured to compare the current sense signal with the peak value of the reference current sense signal to provide a current limit signal adapted to trigger reset to the output switch driving signal once the current sense signal reaches the peak value of the reference current sense signal, and wherein the output switch driving signal is used to turn off the power switch in the one phase when it is reset.

16. The controller of claim 12, further comprises:

a peak detection module, coupled to the current limit terminal of the controller, and configured to discharge an output terminal of the peak detection module in response to each rising edge of the input switch driving signal, and further configured to sample the reference current sense signal in response to each falling edge of the input switch driving signal to provide the peak value of the reference current sense signal at the output terminal of the peak detection module; and a current limit module, coupled to the peak detection module to receive the peak value of the reference current sense signal, and further coupled to the current sense terminal of the controller to receive the current sense signal indicative of the current flowing through the power switch in the one phase, and further configured to compare the current sense signal with the peak value of the reference current sense signal to provide a current limit signal adapted to trigger reset to the output switch driving signal once the current sense signal reaches the peak value of the reference current sense signal, and wherein the output switch driving signal is used to turn off the power switch in the one phase when it is reset.

* * * * *